US012640038B2

(12) United States Patent
Zhou et al.

(10) Patent No.: US 12,640,038 B2
(45) Date of Patent: May 26, 2026

(54) SYSTEMS AND METHODS FOR PREDICTING COLLISION PROBABILITIES ASSOCIATED WITH ROADWAY INTERSECTIONS

(71) Applicant: Geotab Inc., Oakville (CA)

(72) Inventors: Xinrong Zhou, Toronto (CA); Vinay Kiran Manjunath, Kitchener (CA); Jiawei Yu, Aurora (CA); Meenakshi Sundaram Murugesan, Oakville (CA); Tuhin Tiwari, Kitchener (CA); Willem Petersen, Elmira (CA); Xin Zhang, Waterloo (CA); Gregory Gordon Douglas Hines, Mississauga (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/906,612

(22) Filed: Oct. 4, 2024

(65) Prior Publication Data

US 2025/0118204 A1 Apr. 10, 2025

Related U.S. Application Data

(60) Provisional application No. 63/542,412, filed on Oct. 4, 2023, provisional application No. 63/609,411, filed on Dec. 13, 2023.

(51) Int. Cl.
*G08G 1/16* (2006.01)
*G08G 1/01* (2006.01)

(52) U.S. Cl.
CPC ............ *G08G 1/16* (2013.01); *G08G 1/0125* (2013.01)

(58) Field of Classification Search
CPC .............................. G08G 1/0125; G08G 1/16
(Continued)

(56) References Cited

U.S. PATENT DOCUMENTS 9,002,645 B2 4/2015 Davidson
11,735,037 B2 * 8/2023 Matus ................. G06V 20/584 701/117

(Continued)

FOREIGN PATENT DOCUMENTS

CN 115457757 A * 12/2022 .......... G08G 1/0137
CN 116386316 A * 7/2023 .......... G08G 1/0104

(Continued)

OTHER PUBLICATIONS

Extended European Search Report for European Application No. 24204253.9 mailed Mar. 14, 2025, 10 pages.

*Primary Examiner* — Atul Trivedi
(74) *Attorney, Agent, or Firm* — Gabriel F. Rogers

(57) ABSTRACT

Disclosed herein are systems and methods for predicting collision risk associated with a roadway intersection. The methods may comprise operating at least one processor to: receive map data and telematics data originating from telematics devices installed in a plurality of vehicles; identify, using the map data, one or more roadway intersections; determine, using the telematics data and/or map data, for each of the one or more roadway intersections, one or more roadway intersection metrics thereof; determine a hazard rating for each roadway of each roadway intersection; and generate a collision probability for each roadway intersection by inputting into a machine learning model the one or more roadway intersection metrics and the hazard rating of each roadway thereof, the collision probability representing a risk of collision for a vehicle traversing the intersection.

17 Claims, 6 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 11,760,482 | B1 | 9/2023 | Durand | |
| 2008/0133136 | A1* | 6/2008 | Breed | G05D 1/0246 340/901 |
| 2008/0167821 | A1* | 7/2008 | Breed | G08G 1/161 701/301 |
| 2016/0133130 | A1 | 5/2016 | Grimm et al. | |
| 2016/0334227 | A1 | 11/2016 | Davidson | |
| 2017/0241791 | A1* | 8/2017 | Madigan | G06Q 40/08 |
| 2018/0061230 | A1 | 3/2018 | Madigan et al. | |
| 2019/0195628 | A1 | 6/2019 | Lam et al. | |
| 2019/0371167 | A1 | 12/2019 | Min et al. | |
| 2021/0304593 | A1* | 9/2021 | Matus | G08G 1/0129 |
| 2022/0034671 | A1* | 2/2022 | Pal | G01C 21/3691 |
| 2022/0051559 | A1* | 2/2022 | Lewis | G07C 5/085 |
| 2022/0065639 | A1* | 3/2022 | Mistele | G01C 21/3446 |
| 2022/0242427 | A1* | 8/2022 | Petersen | G07C 5/085 |
| 2022/0410882 | A1* | 12/2022 | Bush | B60W 30/0956 |
| 2023/0033672 | A1 | 2/2023 | Nayak et al. | |
| 2023/0169867 | A1* | 6/2023 | Dewey | G08G 1/04 701/117 |
| 2023/0204378 | A1* | 6/2023 | Fowe | G08G 1/0129 701/450 |
| 2023/0230502 | A1* | 7/2023 | Moehr | G09B 19/167 |
| 2023/0245564 | A1* | 8/2023 | James | H04W 4/44 701/117 |
| 2023/0260393 | A1* | 8/2023 | Boenisch | G08G 1/0116 701/117 |
| 2023/0298468 | A1* | 9/2023 | Jha | G08G 1/164 701/117 |
| 2023/0316921 | A1* | 10/2023 | Ramamurthy | G08G 1/166 701/117 |
| 2024/0416907 | A1* | 12/2024 | Barrera | B60W 30/18163 |
| 2025/0085135 | A1* | 3/2025 | Collins | G08G 1/0141 |

FOREIGN PATENT DOCUMENTS

| | | | | | |
|---|---|---|---|---|---|
| CN | 117456731 | A | * | 1/2024 | G08G 1/0125 |
| CN | 118781806 | A | * | 10/2024 | G08G 1/042 |
| DE | 102022109017 | A1 | * | 12/2022 | G06N 20/00 |
| GB | 2405279 | A | * | 2/2005 | G01S 19/074 |
| KR | 102691374 | B1 | * | 8/2024 | G08G 1/166 |

* cited by examiner

SYSTEMS AND METHODS FOR PREDICTING COLLISION PROBABILITIES ASSOCIATED WITH ROADWAY INTERSECTIONS

CROSS-REFERENCE TO RELATED APPLICATIONS

This application claims priority to and the benefit of U.S. Patent Application Ser. No. 63/542,412, filed on Oct. 4, 2023, and U.S. Patent Application Ser. No. 63/609,411, filed on Dec. 13, 2023, each of which is hereby incorporated by reference in its entirety.

TECHNICAL FIELD

The present disclosure generally relates to infrastructure safety. More specifically, the present disclosure relates to determining risk associated with roadway intersections using telematics data.

BACKGROUND

Telematics data obtained from vehicles may include information, parameters, attributes, characteristics, and/or features associated with the vehicles. For example, telematics data may include data relating to various components of the vehicle (e.g., airbag status, engine data, brake data, transmission data, and the like), location data (e.g., a GPS location), vehicle identifying information, etc.

While telematics data may be used to gain insights about various aspects of the vehicles from which it is collected, the telematics data may also be used to provide insights about the area or areas within which the vehicles operate. For example, using telematics data such as geospatial data, airbag data, and/or the like, a user may be able to determine whether a vehicle has been in a traffic accident, collision, or crash, the location of such an incident, etc.

As will be appreciated, traffic accidents, collisions, or crashes involving vehicles may have serious consequences. For example, crashes may result in serious injuries or, in some cases, fatal injuries to vehicle operators, vehicle passengers, cyclists, and/or pedestrians. As well, collisions may have significant costs associated therewith, such as those associated with vehicle damage, property damage (e.g., damage to cargo carried on the vehicle), insurance ramifications, incurred legal fees, medical treatments, operational delays, internal procedures (e.g., updating of internal SOPs), etc. It is desirable for a number of reasons to avoid traffic accidents, collisions, and crashers wherever possible.

Notably, in the year 2020 in Canada, according to the National Collision Database, 41% of serious injuries occurred at roadway intersections. Thus, roadway intersections represent a significant source of traffic accidents, collisions, or crashes and, as a result, it may be desirable to assess the risk associated with individual roadway intersections such that a vehicle operator or, for example, a fleet manager, may plan a route that minimizes traversal of higher-risk, or unsafe, roadway intersections. However, conventional techniques for assessing roadway safety may generally focus on the risk associated with the intersecting roadways rather than a roadway intersection itself. Such conventional techniques may therefore provide inaccurate risk assessments of roadway intersections, which, as will be appreciated, may cause a vehicle operator, fleet manager, etc. to unnecessarily plan a route through a particularly hazardous roadway intersection.

A need therefore exists for improved systems and methods for determining risk associated with roadway intersections.

SUMMARY

In one aspect, the present disclosure relates to a system for predicting collision risk associated with a roadway intersection, the system comprising: at least one data storage operable to store map data and telematics data originating from telematics devices installed in a plurality of vehicles; and at least one processor, in communication with the at least one data storage, operable to: identify, using the map data, one or more roadway intersections; determine, using the telematics data and/or the map data, for each roadway intersection, one or more roadway intersection metrics thereof; determine a hazard rating for each roadway of each roadway intersection; and generate a collision probability for each roadway intersection by inputting into a machine learning model the one or more roadway intersection metrics and the hazard rating of each roadway thereof, the collision probability representing a risk of collision for a vehicle traversing the roadway intersection.

In some embodiments, the one or more roadway intersection metrics comprise an intersection turn percentage, an intersection traversal time, an intersection complexity metric, or a combination thereof.

In some embodiments, the intersection turn percentage comprises a left turn percentage, a right turn percentage, a straight-through percentage, or a combination thereof.

In some embodiments, the intersection traversal time comprises a left turn time, a right turn time, a straight-through time, or a combination thereof.

In some embodiments, the intersection complexity metric comprises an intersection vehicle entropy, an intersection turn entropy, an intersection road entropy, or a combination thereof.

In some embodiments, the at least one processor is further operable to determine, using the telematics data and/or the map data, one or more roadway metrics of each roadway of each roadway intersection.

In some embodiments, the one or more roadway metrics comprise a static roadway metric, a driving behavior metric, a traffic volume metric, a traffic speed metric, a travel time metric, an environmental metric, a congestion metric, a vehicle complexity metric, or a combination thereof.

In some embodiments, the at least one processor is operable to determine the collision probability for each roadway intersection by inputting into the machine learning model the one or more roadway intersection metrics, the hazard rating, and the one or more roadway metrics of each roadway thereof.

In some embodiments, the at least one processor is operable to determine the hazard rating of each roadway of each roadway intersection based at least in part on a number of collisions that have occurred therealong within a selected time period.

In some embodiments, the hazard rating comprises a binary rating.

In some embodiments, the machine learning model comprises a classification model.

In some embodiments, the classification model comprises a random forest (RF) model, a logistic regression (LR) model, a gradient boosting (GB) model, or a combination thereof.

In another aspect, the present disclosure relates to a system for predicting collision risk associated with a roadway intersection, the system comprising: at least one data storage operable to store map data and telematics data originating from telematics devices installed in a plurality of vehicles; and at least one processor, in communication with the at least one data storage, operable to: train a machine learning model to generate a collision probability for a roadway intersection by inputting into the machine learning model training data associated with one or more previously-identified roadway intersections, the training data comprising: one or more previously-determined roadway intersection metrics associated with each previously-identified roadway intersection, a previously-determined hazard rating of each roadway of each previously-identified roadway intersection, and a previously-determined collision probability associated with each previously-identified roadway intersection; identify, using the map data, one or more additional roadway intersections; determine, using the telematics data and/or the map data, for each roadway of each additional roadway intersection, one or more roadway intersection metrics thereof; determine a hazard rating for each roadway of each additional roadway intersection; generate a collision probability of each additional roadway intersection by inputting into the machine learning model the one or more roadway intersection metrics and the hazard rating of each roadway thereof; and modify the training data to include the one or more roadway intersection metrics of each roadway of each additional roadway intersection, the hazard rating of each roadway of each additional roadway intersection, and the collision probability of each additional roadway intersection.

In another aspect, the present disclosure relates to a method for predicting collision risk associated with a roadway intersection, the method comprising operating at least one processor to: receive map data and telematics data originating from telematics devices installed in a plurality of vehicles; identify, using the map data, one or more roadway intersections; determine, using the telematics data and/or map data, for each of the one or more roadway intersections, one or more roadway intersection metrics thereof; determine a hazard rating for each roadway of each roadway intersection; and generate a collision probability for each roadway intersection by inputting into a machine learning model the one or more roadway intersection metrics and the hazard rating of each roadway thereof, the collision probability representing a risk of collision for a vehicle traversing the roadway intersection.

In some embodiments, the one or more roadway intersection metrics comprise an intersection turn percentage, an intersection traversal time, an intersection complexity metric, or a combination thereof.

In some embodiments, the intersection turn percentage comprises a left turn percentage, a right turn percentage, a straight-through percentage, or a combination thereof.

In some embodiments, the intersection traversal time comprises a left turn time, a right turn time, a straight-through time, or a combination thereof.

In some embodiments, the intersection complexity metric comprises an intersection vehicle entropy, an intersection turn entropy, an intersection road entropy, or a combination thereof.

In some embodiments, the method further comprises operating the at least one processor to determine, using the telematics data and/or the map data, one or more roadway metrics of each roadway of each roadway intersection.

In some embodiments, the one or more roadway metrics comprise a static roadway metric, a driving behavior metric, a traffic volume metric, a traffic speed metric, a travel time metric, an environmental metric, a congestion metric, a vehicle complexity metric, or a combination thereof.

In some embodiments, the generating of the collision probability of each roadway intersection comprises operating the at least one processor to input into the machine learning model the one or more roadway intersection metrics, the hazard rating, and the one or more roadway metrics of each roadway thereof.

In some embodiments, the determining of the hazard rating is based at least in part on a number of traffic collisions that have occurred along each roadway of each roadway intersection within a selected time period.

In some embodiments, the hazard rating comprises a binary rating.

In some embodiments, the machine learning model comprises a classification model.

In some embodiments, the classification model comprises a random forest (RF) model, a logistic regression (LR) model, a gradient boosting (GB) model, or a combination thereof.

In another aspect, the present disclosure relates to a method for predicting collision risk associated with a roadway intersection, the method comprising operating at least one processor to: receive map data and telematics data originating from telematics devices installed in a plurality of vehicles; train a machine learning model to generate a collision probability for a roadway intersection by inputting into the machine learning model training data associated with one or more previously-identified roadway intersections, the training data comprising: one or more previously-determined roadway intersection metrics associated with each previously-identified roadway intersection, a previously-determined hazard rating of each roadway of each previously-identified roadway intersection, and a previously-determined collision probability associated with each previously-identified roadway intersection; identify, using the map data, one or more additional roadway intersections; determine, using the telematics data and/or the map data, for each roadway of each additional roadway intersection, one or more roadway intersection metrics thereof; determine a hazard rating for each roadway of each additional roadway intersection; generate a collision probability of each additional roadway intersection by inputting into the machine learning model the one or more roadway intersection metrics and the hazard rating of each roadway thereof; and modify the training data to include the one or more roadway intersection metrics of each roadway of each additional roadway intersection, the hazard rating of each roadway of each additional roadway intersection, and the collision probability of each additional roadway intersection.

In another aspect, the present disclosure relates to a non-transitory computer readable medium having instructions stored thereon executable by at least one processor to implement the methods described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
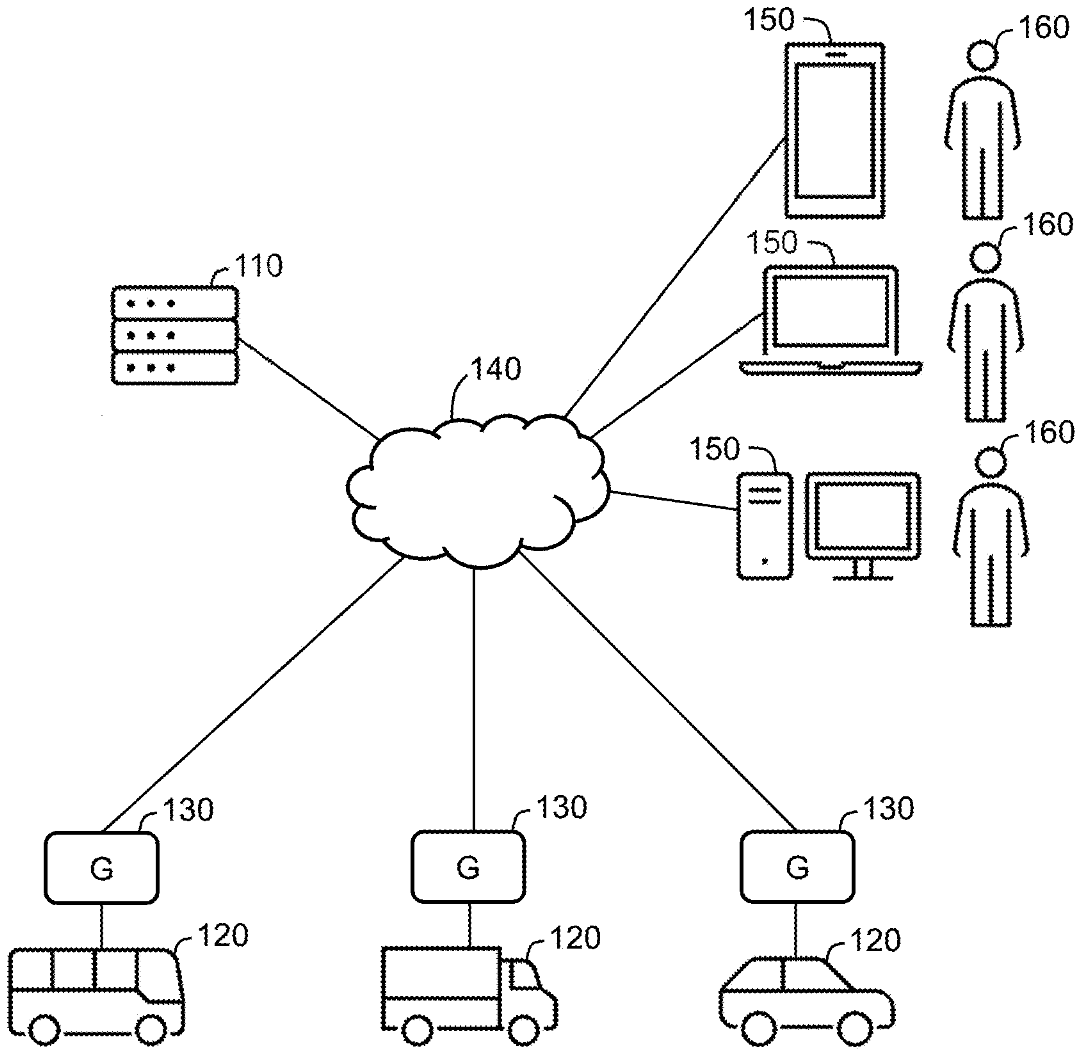
FIG. 1 is a block diagram of various components interacting with an example fleet management system according to an embodiment of the present disclosure.

Traffic accidents, collisions, or crashes involving vehicles may have serious consequences. For example, crashes may result in serious injuries or, in some cases, fatal injuries to a variety of stakeholders, including vehicle operators, vehicle passengers, cyclists, and pedestrians. In addition to bodily harm, collisions may have significant costs associated therewith, such as those associated with vehicle damage, property damage (e.g., damage to cargo carried on the vehicle), insurance ramifications, incurred legal fees, medical treatments, operational delays, internal procedures (e.g., updating of internal SOPs), etc. It is therefore desirable to avoid traffic accidents, collisions, and crashers wherever possible.

One way for a vehicle operator to avoid potential traffic accidents, collisions, or crashes is to avoid infrastructure (e.g., roadways, or portions of roadways) that may be particularly risky to traverse. For example, operators of heavy-duty trucks (e.g., class 6 vehicles) may choose to avoid roadways that are particularly busy (e.g., have a relative high traffic volume), that include sharp or difficult to navigate turns, that are not well-maintained, or any other conditions could lead to a collision.

One type of infrastructure that may be particularly risky to traverse is a roadway intersection. In fact, in the year 2020 in Canada, according to the National Collision Database 41% of serious injuries occurred at roadway intersections. However, as will be appreciated, it may often be difficult, if not impossible, to avoid roadway intersections altogether. It may therefore be desirable to assess the risk associated with individual roadway intersections such that a vehicle operator or, for example, a fleet manager, may plan a route that minimizes traversal of roadway intersections that are particularly unsafe or risky.

Conventional techniques for assessing roadway safety, however, may generally focus on the risk associated with the intersecting roadways (i.e., the roadways of the intersection) rather than the roadway intersection itself. Such conventional techniques may therefore provide inaccurate risk assessments of roadway intersections, which, as will be appreciated, may cause a vehicle operator, fleet manager, etc. to unnecessarily plan a route through a particularly hazardous roadway intersection.

Thus, it is an objective of the present disclosure to provide advantageous systems and methods for predicting collision risk associated with roadway intersections. For example, in some embodiments, the systems and methods of the present disclosure may use one or more roadway intersection metrics in the generation of a collision probability for a roadway intersection. As will be described herein, such roadway intersection metrics may be particularly well-suited for providing accurate collision probabilities for roadway intersections. That is, the one or more roadway intersection metrics identified by the inventors of the present disclosure may have particularly useful predictive capabilities.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the vehicle data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
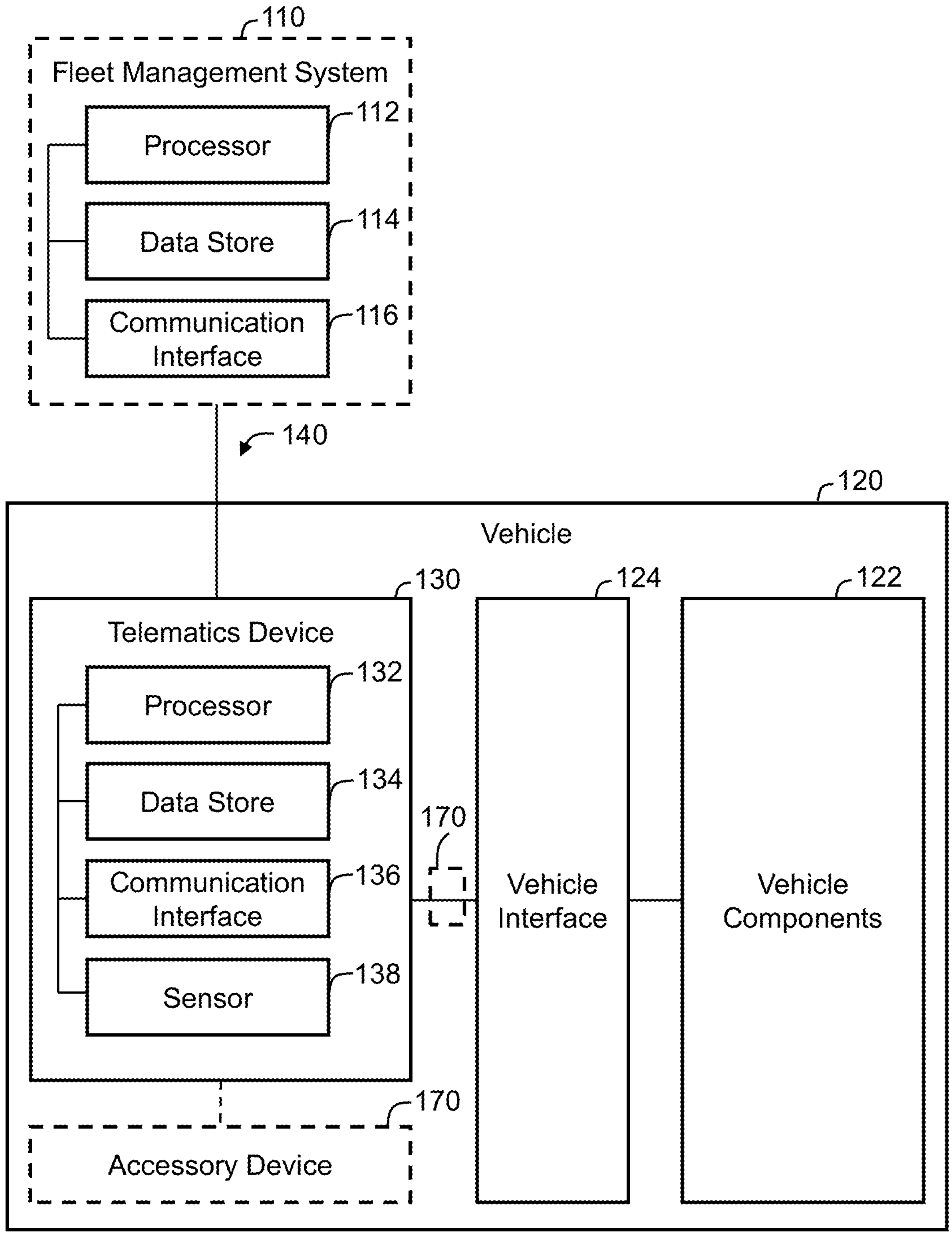
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
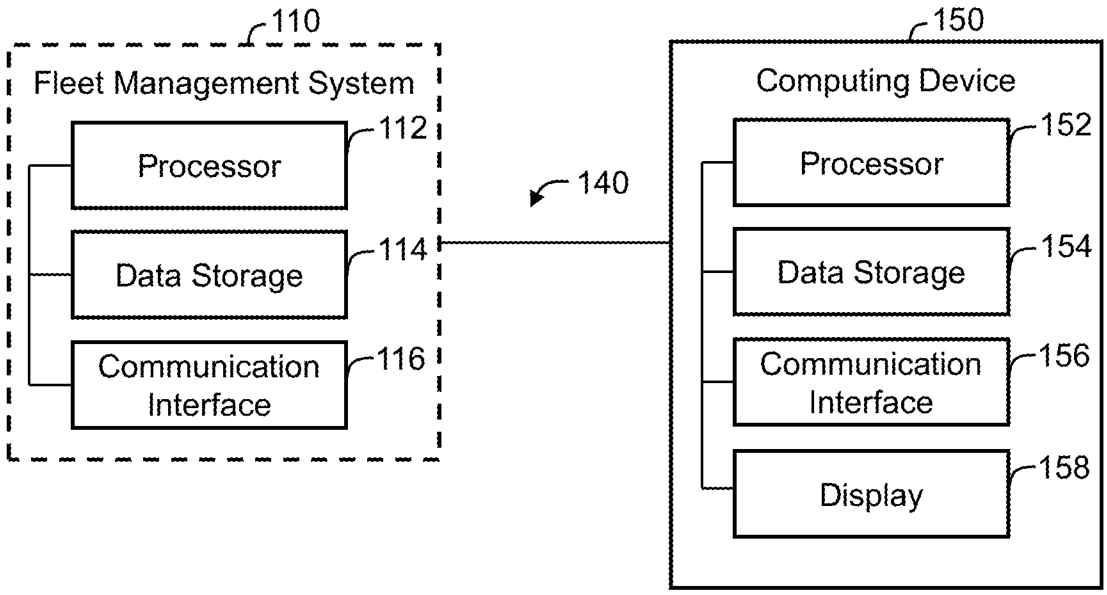
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
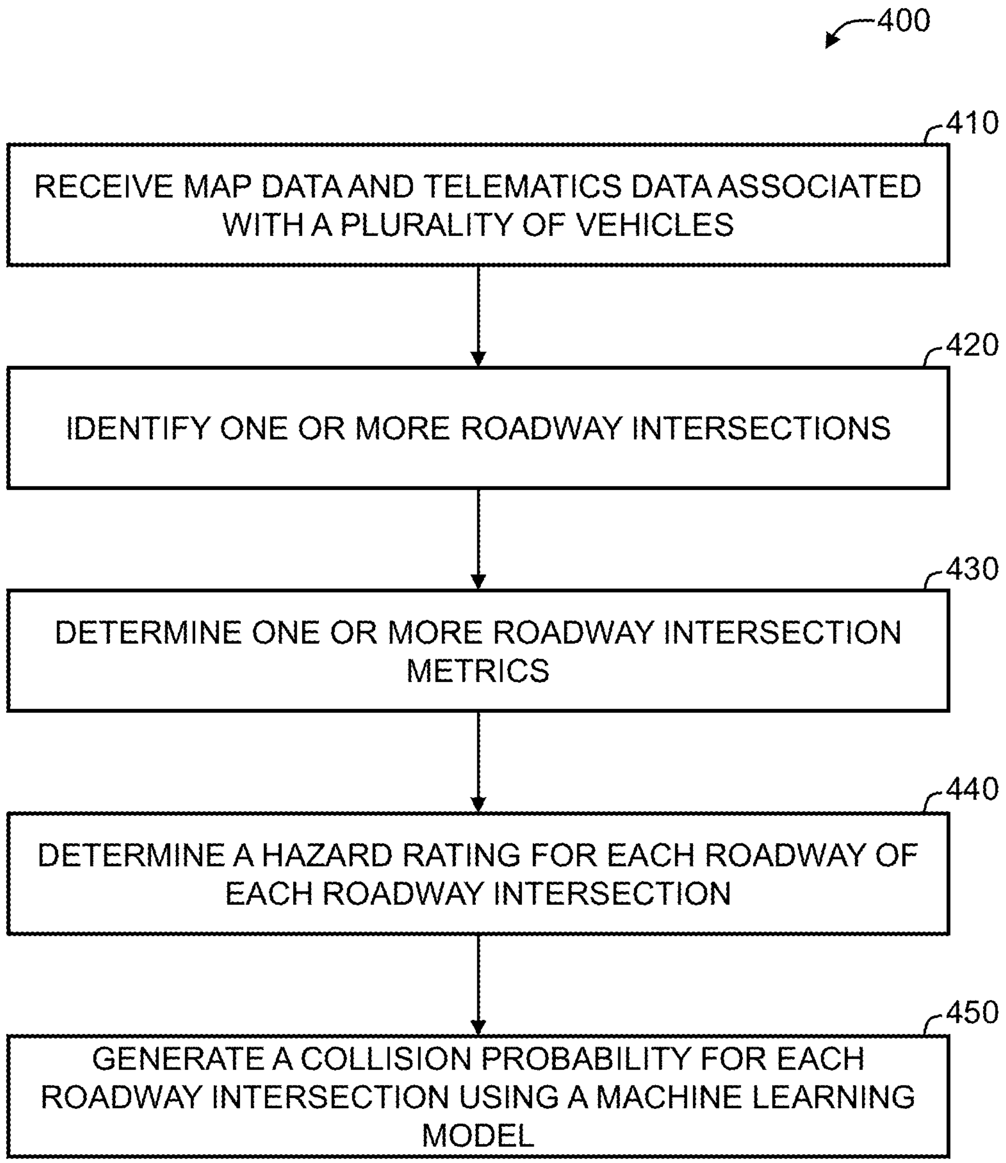
FIG. 4 is a flowchart of an example method for predicting a collision risk associated with a roadway intersection.

Referring now to FIG. 4, there is shown an example of a method for predicting collision risk associated with a roadway intersection (400). As shown, the method 400 may comprise operating at least one processor to: receive map data and telematics data originating from telematics devices installed in a plurality of vehicles (410); identify, using the map data, one or more roadway intersections (420); determine, using the telematics data and/or the map data, for each roadway intersection, one or more roadway intersection metrics thereof (430); determine a hazard rating for each roadway of each roadway intersection (440); and generate a collision probability for each roadway intersection by inputting into a machine learning model the one or more roadway intersection metrics and the hazard rating of each roadway thereof, the collision probability representing a risk of collision for a vehicle traversing the roadway intersection (450).

The method 400 may be implemented using any suitable combination of hardware and software, such as those described in reference to FIG. 1 to FIG. 3. For example, one or more operations (e.g., operations 410, 420, 430, 440, and/or 450) of the method 400 may be implemented at the fleet management system 110 (e.g., by the processor 112 executing instructions stored on the data storage 114), at the telematics devices 130 (e.g., by the processor 132 executing instructions stored on the data storage 134), at the computing devices 150 (e.g., by the processor 152 executing instructions stored on the data storage 154), or a combination thereof. As will be appreciated, because the systems and methods of the present disclosure may involve the processing of large amounts of telematics data (e.g., telematics data originating from a vehicle fleet of tens, hundreds, or even thousands of vehicles), the systems and methods of the present disclosure require implementation via a computer (e.g., one or more of the processors 112, 132, and 152).

In embodiments where at least a portion of the method 400 is implemented by a fleet management system (e.g., the fleet management system 110), less processing may be executed by telematics devices (e.g., the telematics devices 130) and/or other computing devices (e.g., the computing devices 150). As a result, the hardware complexity of the telematics devices and/or the other computing devices may be reduced, which, in turn, may reduce the costs associated therewith. As well, it may also in some cases be easier to update and/or modify software running on a fleet management system as compared to telematics devices and/or other computing devices. On the other hand, in embodiments where at least a portion of the method 400 is implemented by telematics devices, less data may be transmitted to a fleet management system and/or other computing devices, thereby reducing network usage and network bandwidth. As will be appreciated, in such implementations, usage costs associated with network usage may in turn also be reduced. Thus, the method 400 may be implemented in a variety of ways and each implementation may have advantages associated therewith.

As shown in FIG. 4 at 410, map data and telematics data may be received.

The telematics data may originate from a plurality of telematics devices installed in a plurality of vehicles. The telematics data may be obtained from the plurality of vehicles using, for example, one or more of the systems outlined in FIG. 1 to FIG. 3. For example, the telematics device 130 (e.g., the processor 132) may receive telematics data from the sensor 138, vehicle components 122, or a combination thereof. Alternatively, or additionally, the fleet management system 110 (e.g., the processor 112) may receive telematics data from the telematics device 130. Additionally, or alternatively, the computing device 150 (e.g., the processor 152) may receive telematics data from the telematics device 130 and/or the fleet management system 110. Additionally, or alternatively, the telematics device 130, the fleet management system 110, and/or the computing device 150 may receive telematics data from one or more data storages (e.g., one or more of the data storages 114, 134, 154).

As will be described herein, the telematics data may be used to one or more metrics relating to traversal of an intersection, a roadway of the intersection, etc. by a vehicle. Thus, the telematics data may include data such as, but not limited to, geospatial data (e.g., GPS coordinates, speed data, etc.) and vehicle identifying information (e.g., vehicle identification numbers, or "VINs") associated with the vehicles having the telematics devices installed therein. As will be appreciated, the particular types of data included in the telematics data may be selected based on the particular roadway intersection metrics (and, in some embodiments, roadway metrics) used by the systems and methods described herein.

In some embodiments, the telematics data may be preprocessed prior to and/or subsequently to being received. For example, the telematics data may be received in one or more various formats, standards, or protocols. In some cases, it may be beneficial to reformat the telematics data prior to use in the systems and methods of the present disclosure. As a further example, the telematics data may include datapoints reported at irregular frequencies and/or that correspond to mismatched points in time. In such cases, the telematics data may be interpolated so that the datapoints in each time series correspond to successive and/or equally spaced points in time. As a yet further example, and as will be described herein, the telematics data may be curve-logged telematics data, which may result in a reduced number of received datapoints. In such implementations, the reduced number of datapoints may be interpolated to provide a fulsome dataset.

With respect to the map data, there may be included therein information, parameters, attributes, characteristics, and/or features associated with a geographical area. As will be described herein, the map data may be used to identify roadway intersections, determine certain metrics, etc. Thus, the map data may generally include information relating to the location, placement, size, shape, and/or design of infrastructure (e.g., road networks comprising roadways such as, but not limited to, roads, streets, highways, freeways, alleyways, etc.). In some embodiments, the map data may additionally include information relating to topographical features (e.g., rivers, mountains, hills, greenways, etc.), regulatory features, (e.g., country borders, state or provincial borders, city limits, counties, neighbourhoods, etc.) or a combination thereof. The map data may be obtained from, for example, various map information providers such as OpenStreetMap (OSM).

At operation 420 of the method 400, one or more roadway intersections may be identified using the map data. As used herein, the term "roadway intersection" is intended to include any intersection between two or more roadways. The roadways may be any type of infrastructure along which a vehicle may operate and may include, but are not limited to, roads, streets, highways, freeways, alleyways, etc.

The roadway intersections may be identified by the at least one processor (e.g., one or more of the processors 112, 132, 152) using the map data. As will be appreciated, in some cases, map data may represent road networks (and the roadways thereof) as a series of edges, wherein each roadway of the road networks may be represented as an edge. In such cases, the at least one processor may identify roadway intersections by identifying intersections between different edges.

Further, it may in some cases be useful to identify the one or more roadway intersections within a selected area. The selected area may be, for example, an area within which a user operates (e.g., operates a vehicle, manages a vehicle fleet, etc.). The particular selected area may be a user-defined area, or not. For example, the selected area may correspond to a particular geographically and/or regulatorily defined area such as, but not limited to, countries, states, cities, continents, and the like. Thus, in some embodiments, the identifying of the one or more roadway intersections may comprise operating the at least one processor to identify the one or more roadway intersections within a selected area.

At 430 of the method 400, one or more roadway intersection metrics for each of the one or more roadway intersection may be determined using the telematics data. The one or more roadway intersection metrics may include metrics relating to the traversal of a roadway intersection by a vehicle. The one or more roadway intersection metrics may be based at least in part on telematics data obtained from vehicles traversing the roadway intersection and/or roadways of the intersection, map data obtained from a map information provider, or a combination thereof.

In more detail, the one or more roadway intersection metrics directly obtained from the telematics data and/or map data, or may be derived therefrom. The inventors of the present disclosure conducted an extensive exploratory data analysis (EDA) to identify metrics that have predictive capabilities with respect to intersection riskiness. Roadway intersection metrics that have such predictive capabilities, alone or in combination with one or more other roadway intersection metrics, are listed below in Table 1.

TABLE 1

Roadway Intersection Metrics Identified as Having Predictive Capabilities

| Category | Metric | Description |
|---|---|---|
| Intersection Turn Percentage | Left Turn Percentage<br>Right Turn Percentage<br>Straight-through Percentage | Percentage of vehicles traversing intersection via a left turn, a right turn, or straight-through |
| Intersection Traversal Time | Left Turn Time<br>Right Turn Time<br>Straight-through Time | Duration of time spent by vehicles traversing the intersection via a left turn, a right turn, or straight-through |
| Intersection Complexity Metrics | Intersection Vehicle Entropy | Representation of complexity of vehicle types traversing the intersection |
| | Intersection Turn Entropy | Representation of complexity of how vehicles traverse the intersection (e.g., left turns, right turns, straight-through) |
| | Intersection Road Entropy | Representation of complexity of roadway types forming the intersection |

The roadway intersection metrics outlined in Table 1 will be described in more detail below.

The intersection turn percentage may comprise a left turn percentage, a right turn percentage, a straight-through percentage, or a combination thereof. Each turn percentage may be determined based on, for example, the number of particular turns (i.e., left or right), or the number of straight-through traversals, as a percentage of the total number of roadway intersection traversals in a given time period (e.g., per hour, per day, per month, etc.).

The intersection traversal time may comprise a right turn time, a left turn time, a straight-through time, or a combination thereof. Each turn time may represent the amount of time it takes for a vehicle to traverse the roadway intersection by way of a left turn, a right turn, or by traversing straight-through. Each turn time may be determined by, for example, averaging the time it takes for a plurality of vehicles to traverse the intersection when performing a left turn, a right turn, or by traversing straight-through in a given time period (e.g., per hour, per day, per month, etc.).

The intersection complexity metrics may comprise an intersection vehicle entropy, an intersection turn entropy, an intersection road entropy, or a combination thereof. In the field of information theory, entropy generally represents a measure of uncertainty or disorder within a system. Thus, in the context of the systems and methods of the present disclosure, entropy may indicate the complexity of a particular feature of a roadway intersection, which may in turn, be indicative of the riskiness of that roadway intersection.

In more detail, the intersection vehicle entropy (IVE) may therefore indicate the complexity of vehicle types traversing a roadway intersection. One technique for determining intersection vehicle entropy is exemplified below:

$$IVE = -\sum_i \left(\frac{\text{number of vehicle of type } i}{\text{number of total vehicles}}\right) \cdot \log_2\left(\frac{\text{number of vehicle of type } i}{\text{number of total vehicles}}\right)$$

In the above formula, "i" represents a particular type of vehicle traversing the intersection. As will be appreciated, the intersection vehicle entropy may be determined by taking into account each vehicle type that traverses the roadway intersection. As described herein, the type of vehicles traversing the roadway intersection may be determined from telematics data comprising, for example, VINs associated vehicles traversing the roadway intersection.

Intersection turn entropy (ITE) may indicate the complexity of types of turns (i.e., left turns, right turns, and straight-through traversals) performed by vehicles to traverse a roadway intersection. One technique for determine intersection turn entropy is exemplified below:

$$ITE = -((\text{left }\%)\cdot\log_2(\text{left }\%) + (\text{right }\%)\cdot\log_2(\text{right }\%) + (\text{straight }\%)\cdot\log_2(\text{straight }\%))$$

In the above formula, "left %", "right %", and "straight %" represents a percentage of vehicles making left turns, right turns, and straight-through traversals at the roadway intersection, respectively, each of which may be determined as described above.

Intersection road entropy (IRE) may indicate the complexity of road types forming the roadway intersection. One technique for determining intersection vehicle entropy is exemplified below:

$$IVE = -\sum_i \left(\frac{\text{number of road of type } i}{\text{number of total roads}}\right)\cdot\log_2\left(\frac{\text{number of road of type } i}{\text{number of total roads}}\right)$$

In the above formula, "i" represents a particular type of roadway forming the roadway intersection. As will be appreciated, any types of roadways may form intersections. Non-limiting examples of roadway types include streets, avenues, highways, alleyways, and the like. The types of the roadways that form the roadway intersection may be determined from, for example, the map data.

As described herein, the above-exemplified roadway intersection metrics may have predictive capabilities with respect to collision probabilities associated with roadway intersections. That is, the exemplified roadway intersection metrics may be used to predict collision risk associated with a roadway intersection. However, it may in some cases be useful to incorporate one or more additional metrics into the prediction of collision risk associated with roadway intersections. For example, it may be useful to determine one or more roadway metrics associated with each of the roadways forming the roadway intersection for use in predicting risk associated with the roadway intersection.

During the exploratory data analysis performed by the inventors of the present disclosure, a number of roadway metrics having predictive capabilities were identified. Examples of such roadway metrics are included below in Table 2.

TABLE 2

Roadway Metrics having Predictive Capabilities

| Category | Metric | Description |
|---|---|---|
| Static Roadway Metrics | Roadway Length<br>Roadway Type<br>Roadway Speed Limit | Unchanging features of the roadways forming the roadway intersections |
| Driving Behaviour Metrics | Harsh Acceleration<br>Harsh Braking<br>Harsh Cornering | Metrics indicating the frequency of harsh driving events along a roadway |
| Traffic Volume Metrics | Monthly Flow<br>Hourly Flow | Metrics quantifying vehicular flow along a roadway |
| Traffic Speed Metrics | Average Vehicle Speed<br>Vehicle Speed Standard Deviation<br>Median Vehicle Speed<br>Vehicle Speed Percentile | Metrics describing vehicle speeds along a roadway |
| Travel Time Metrics | Average Travel Time<br>Travel Time Standard Deviation<br>Median Travel Time<br>Travel Time Percentile | Metrics describing the time it takes for a vehicle to traverse a roadway |
| Solar Angle | Solar Angle Elevation<br>Horizontal Solar Angle | Metrics describing the solar angle of a roadway at a particular time or time period |
| Congestion Index Metrics | Speed Limit-based Congestion<br>Average Speed-based Congestion | Metrics describing the congestion along a roadway using a speed limit of a roadway or an average speed of vehicles traversing that roadway |
| Vehicle Complexity | Vehicle Type Entropy | Representation of complexity of vehicle types traversing a roadway |

The roadway metrics outlined in Table 2 will be described in more detail below.

The static roadway metrics may comprise a roadway length metric, a roadway type metric, a roadway speed limit metric, or a combination thereof. As will be appreciated, such roadway metrics are static in that the metrics may be considered "permanent". Of course, it may be the case that such static metrics do change (e.g., a roadway speed limit is changed by a regulatory body), albeit infrequently. The static roadway metrics may be obtained, for example, from the map data obtained from a map information provided such as OSM, as described herein.

The driving behaviour metrics may comprise a harsh acceleration metric, a harsh braking metric a harsh cornering metric, or a combination thereof. The driving behaviour metrics may indicate the frequency of harsh driving events along a roadway. A harsh driving event may generally refer to occasions where an operator of a vehicle exceeded a predetermined acceleration limit. For example, a harsh acceleration event may include driving events wherein excessive positive longitudinal acceleration of the vehicle occurs. A harsh braking event may include driving events wherein an excessive negative longitudinal acceleration of the vehicle occurs. A harsh cornering event may include driving events wherein an excessive lateral acceleration of the vehicle occurs. Such harsh driving events may be identified using the telematics data. For example, the telematics data include the duration, the time of occurrence, and the magnitude of the acceleration of the vehicle during a hash driving event.

The traffic volume metrics may comprise a monthly flow metric, an hourly flow metric, the like, or a combination thereof. The traffic volume metrics may represent the volume of vehicular flow along a roadway—i.e., the amount of vehicles that traverse a roadway within a selected time period (e.g., per hour, per day, per month, etc.).

The travel speed metrics may comprise an average vehicle speed metric, a vehicle speed standard deviation metric, a median vehicle speed metric, a vehicle speed percentile (e.g., an $85^{th}$ percentile vehicle speed) metric, or a combination thereof. The travel speed metrics may therefore describe the observed speeds of vehicles traversing a roadway. As will be appreciated, while roadways generally have speed limits, the actual, observed speeds at which vehicles travel along a roadway may differ therefrom.

The travel time metrics may comprise an average travel time metric, a travel time standard deviation metric, a median travel time metric, a travel time percentile (e.g., an $85^{th}$ percentile vehicle speed) metric, or a combination thereof. The travel time metrics may describe the observed time it takes for a vehicle to traverse the entirety of a roadway.

The solar angle metrics may comprise a solar angle elevation metric, horizontal solar angle metric, or a combination thereof. The solar angle metrics may therefore describe the position of the sun relative to a roadway at a given time. As will be appreciated, the position of the sun may affect the visibility, and in turn, riskiness of a roadway. The solar angle metrics may be determined based on the positioning of a roadway (obtainable using, e.g., the map data), the time of day, and the day of the year.

The congestion index metrics may comprise a speed limit-based congestion metric, an average speed-based congestion metric, or a combination thereof. The congestion index metrics may represent the degree to which a roadway is congested—i.e., experiencing slower than usual vehicle speeds, increased travel times, etc. The congestion index metrics may be determined based on a ratio of, for example, an observed average vehicle speed to a speed limit of a roadway, an observed average vehicle speed to an observed average vehicle speed based on a greater period of time of a roadway (e.g., hourly average speed of roadway:monthly average speed of roadway), etc.

The vehicle complexity metric may comprise a vehicle type entropy metric and may represent the complexity of vehicle types traversing a roadway. The vehicle type entropy metric may be determined in the same manner as described above in relation to the intersection vehicle entropy metric.

Referring again to FIG. 4, at operation 440 of the method 400, a hazard rating for each roadway of the roadway intersection may be determined. The hazard rating may indicate whether a roadway of the roadway intersection is hazardous, safe, etc. The inventors of the present disclosure found that such hazard ratings may also have predictive capabilities with respect to collision risk of a roadway intersection.

The hazard rating of a roadway may be determined using a number of techniques. For example, in some embodiments, the map data may include collision data indicating the number of collisions that have occurred along a roadway. Additionally, or alternatively, in some embodiments, telematics data obtained from vehicles traversing the roadway may indicate that one or more of the vehicles has been involved in a collision (e.g., one or more of the vehicles experience a harsh braking event, airbag data indicating an airbag deployed, etc.).

The hazard rating may be any suitable rating that indicates a hazardousness of a roadway. For example, in some embodiments, the hazard rating may comprise a binary rating. In such embodiments, the binary rating may comprise a "hazardous" rating and a "safe" rating, or the like, thereby indicating binarily that a roadway is either hazardous or safe.

In some embodiments, the determining of the hazard rating may be based at least in part on a number of traffic collisions that have occurred along each roadway of each roadway intersection within a selected time period. For example, a roadway may be identified as hazardous if a number of collisions that occurred therealong within the selected time period is greater than a predetermined threshold. The predetermined threshold may be any suitable threshold. In some embodiments, a roadway be identified as hazardous if more than one collision has occurred therealong. As well, the time period At operation 450 of the method 400, a collision probability for each roadway intersection may be generated. As described herein, the collision probability of a roadway intersection may represent a risk of collision for a vehicle traversing the intersection.

The collision probability for each roadway intersection may be generated using a machine learning model. In more detail, the one or more roadway intersection metrics and the hazard rating of each roadway of the roadway intersection may be input into the machine learning model to generate the collision probability of the roadway intersection. As will be appreciated, the machine learning model will generally be trained to generate the collision probability using the one or more roadway intersection metrics and the hazard ratings of the roadways of the roadway intersection. For example, in some embodiments, the machine learning model may be trained using training data associated with one or more previously-identified roadway intersections that comprises one or more previously-determined roadway intersection metrics associated with each roadway of each previously-identified roadway intersection, a previously-determined hazard rating of each roadway of each previously-identified roadway intersection, and a previously-determined collision probability associated with each previously-identified roadway intersection.

The machine learning model may be any suitable model. For example, in some embodiments, the machine learning model may comprise a classification model. As will be appreciated, classification models are machine learning models that attempt to predict (i.e., output) the correct label of input data (i.e., categorize or "classify" the input data). Examples of such models include, but are not limited to, gradient boosting models, random forest models, and logistic regression models.

In more detail, gradient boosting models generally refer to ensemble machine learning models that generate "weak learner" models (i.e., classification models that perform at least better than classifying at random) in sequence, with each newly generated weak learner model modified to reduce the number of incorrect classifications of a previously generated weak learner model. The weak learner models are generated and optimized until optimal results are obtained. A final gradient boosting model may then be generated by weighting the mean of all of the weak learner models.

Figure 5:
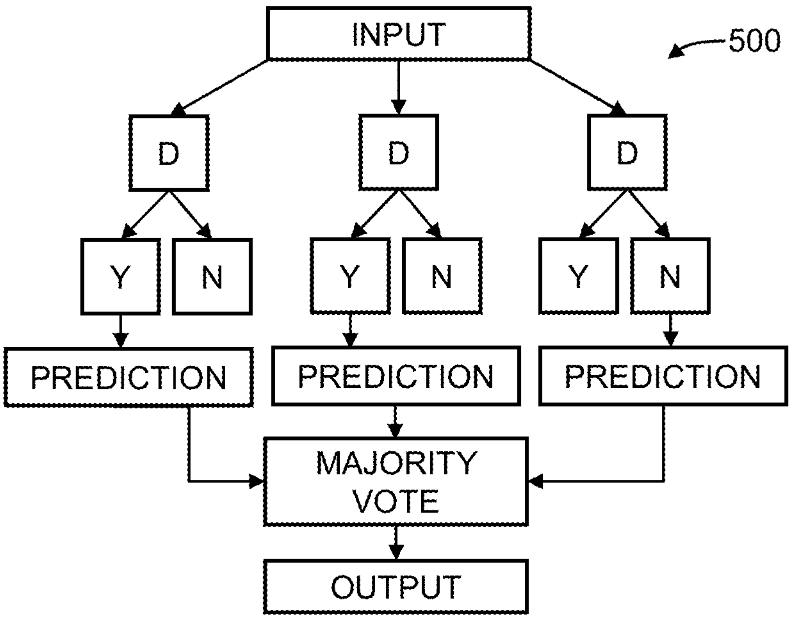
FIG. 5 is a flowchart of a simplified example of a random forest machine learning model.

Random forest models generally refer to ensemble machine learning models that that builds decision trees on random subsets of input data that are subsequently merged (e.g., by majority vote) to provide a predicted output. Generally, building uncorrelated decision trees on random subsets of input data may be useful for reducing variance when predicting outcomes. For illustrative purposes, a simplified example of an RF model is shown in FIG. 5. As shown, an RF model 500 includes a plurality of decision trees (indicated by "D") that produce a prediction (in the illustrated example, either a "Y" for "yes" or a "N" for "no"). The predictions may then be aggregated, for example, by way of a majority vote to determine a predicted output.

Logistic regression models generally refer to machine learning models that estimate the probability of an event occurring based on dataset of independent variables using a logistic function (also referred to as "the sigmoid function"). Classification performed by the model may be based on the probability of the event occurring.

As described herein, the machine learning model may generate the collision probability that represents a rick of collision for a vehicle traversing an intersection. The collision probability may therefore indicate the riskiness of a roadway intersection. A user such as a vehicle operator, a fleet manager, etc. may use the generated collision probabilities to plan a route that avoids particularly risky roadway intersections.

Further, as indicated above, the machine learning model employed by the systems and methods of the present disclosure will generally be trained to generate collision probabilities based on the one or more roadway intersection metrics and the hazard ratings of the roadways of each roadway intersection. However, it may be useful to train the machine learning model on a continuous basis, so that the accuracy of generated collision probability may be maintained, or even improved, over time.

Figure 6:
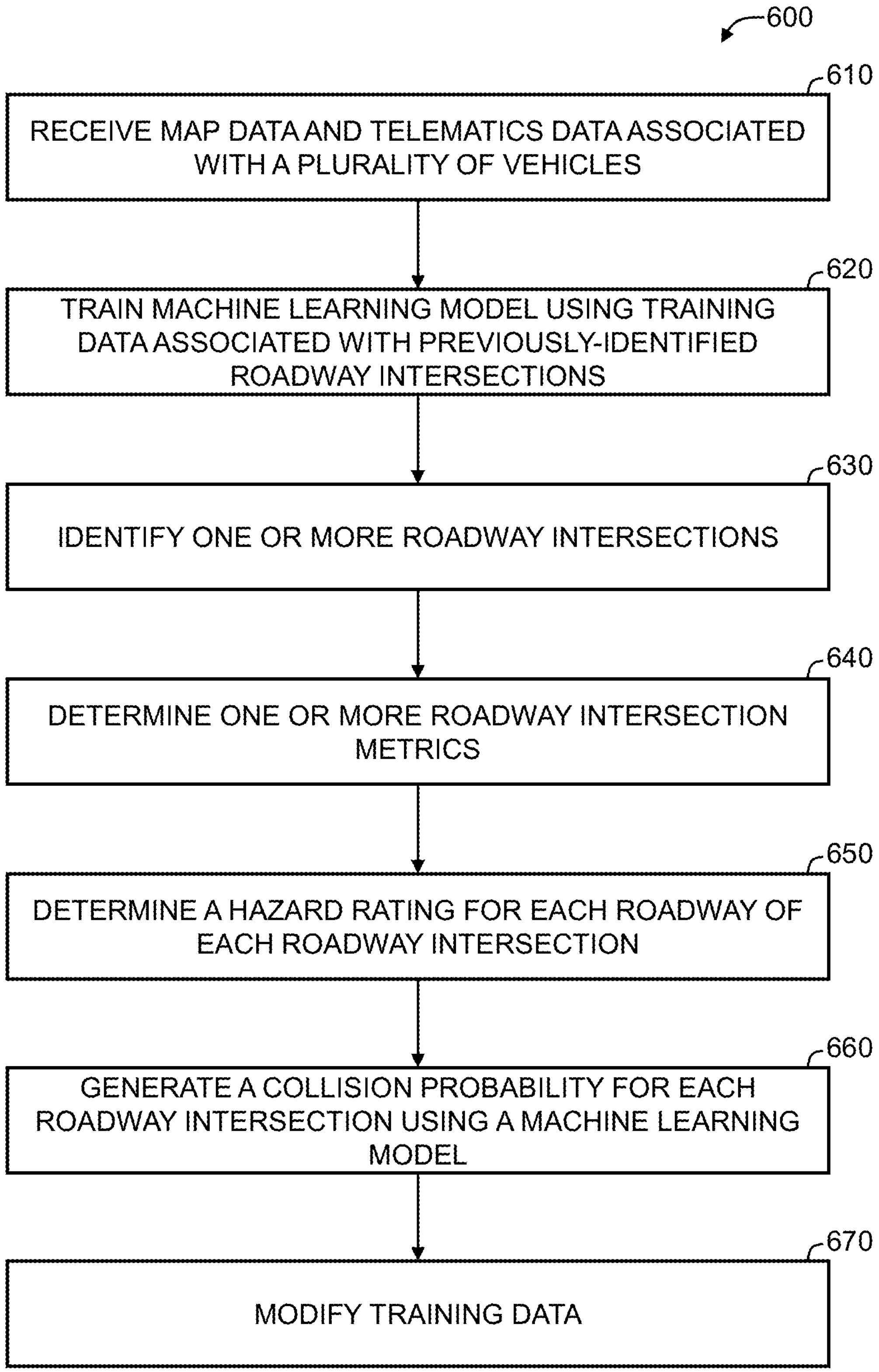
FIG. 6 is a flowchart of a further example method for determining a risk associated with a roadway intersection, according to an embodiment of the present disclosure.

Thus, referring now to FIG. 6, there is shown a method for predicting collision risk associated with a roadway intersection (600). The method 600 comprises operating at least one processor to: receive map data and telematics data originating from telematics devices installed in a plurality of vehicles (610); train a machine learning model to generate a collision probability for a roadway intersection by inputting into the machine learning model training data associated with one or more previously-identified roadway intersections, the training data comprising: one or more previously-determined roadway intersection metrics associated with each roadway of each previously-identified roadway intersection, a previously-determined hazard rating of each roadway of each previously-identified roadway intersection, and a previously-determined collision probability associated with each previously-identified roadway intersection (620); identify, using the map data, one or more additional roadway intersections (630); determine, using the telematics data and/or the map data, for each roadway of each additional roadway intersection, one or more roadway intersection metrics thereof (640); determine a hazard rating for each roadway of each additional roadway intersection (650); generate a collision probability of each additional roadway intersection by inputting into the machine learning model the one or more roadway intersection metrics and the hazard rating of each roadway thereof (660); and modify the training data to include the one or more roadway intersection metrics of each roadway of each additional roadway intersection, the hazard rating of each roadway of each additional roadway intersection, and the collision probability of each additional roadway intersection (670).

The method 600 may be implemented in the same manner or manners as described above in relation to the method 400. As well, each of the operations 610, 630, 640, 650, and 660 of the method 600 may be implemented in the same manner or manners as operations 410, 420, 430, 440, and 450, respectively, of the method 400.

At operation 620 of the method 600, a machine learning model may be trained to generate a collision probability for a roadway intersection. As indicated herein, the machine learning model may be trained using training data associated with one or more previously-identified roadway intersections. The training data may comprise one or more previously-determined roadway intersection metrics associated with each roadway of each previously-identified roadway intersection, a previously-determined hazard rating of each roadway of each previously-identified roadway intersection, and a previously-determined collision probability associated with each previously-identified roadway intersection.

By inputting the training data into the machine learning model, the model may be trained to identify relationships between the previously determined one or more roadway intersection metrics, the previously-determined hazard rating, and the previously-determined collision probabilities of each previously-identified roadway intersection for generating new collision probabilities for newly roadway intersections.

As described above, it may be useful to continuously train the machine learning model. Thus, at operation 670 of the method 600, the training data may be modified to include the one or more roadway intersection metrics of each roadway of each additional roadway intersection, the hazard rating of each roadway of each additional roadway intersection, and the collision probability of each additional roadway intersection. That is, the one or more intersection metrics, the hazard ratings, and the collision probabilities determined after the training of the machine learning model may be used as additional training data to further fine-tune the machine learning model. By doing so, the machine learning model may be continuously trained to thereby maintain, or improve, the accuracy of the collision probabilities generated thereby.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for predicting collision risk associated with a roadway intersection, the system comprising:

at least one data storage operable to store map data and telematics data originating from telematics devices installed in a plurality of vehicles; and at least one processor, in communication with the at least one data storage, operable to:

identify, using the map data, one or more roadway intersections;

determine, using the telematics data and/or the map data, for each roadway intersection, one or more roadway intersection metrics thereof;

determine a hazard rating for each roadway of each roadway intersection based at least in part on a number of collisions that have occurred therealong within a selected time period; and generate a collision probability for each roadway intersection by inputting into a machine learning model the one or more roadway intersection metrics and the hazard rating of each roadway thereof, the collision probability representing a risk of collision for a vehicle traversing the roadway intersection.

2. The system of claim 1, wherein the one or more roadway intersection metrics comprise an intersection turn percentage, an intersection traversal time, an intersection complexity metric, or a combination thereof.

3. The system of claim 2, wherein the intersection turn percentage comprises a left turn percentage, a right turn percentage, a straight-through percentage, or a combination thereof.

4. The system of claim 2, wherein the intersection traversal time comprises a left turn time, a right turn time, a straight-through time, or a combination thereof.

5. The system of claim 2, wherein the intersection complexity metric comprises an intersection vehicle entropy, an intersection turn entropy, an intersection road entropy, or a combination thereof.

6. The system of claim 1, wherein the at least one processor is further operable to determine, using the telematics data and/or the map data, one or more roadway metrics of each roadway of each roadway intersection.

7. The system of claim 6, wherein the one or more roadway metrics comprise a static roadway metric, a driving behavior metric, a traffic volume metric, a traffic speed metric, a travel time metric, an environmental metric, a congestion metric, a vehicle complexity metric, or a combination thereof.

8. The system of claim 7, wherein the at least one processor is operable to determine the collision probability for each roadway intersection by inputting into the machine learning model the one or more roadway intersection metrics, the hazard rating, and the one or more roadway metrics of each roadway thereof.

9. A method for predicting collision risk associated with a roadway intersection, the method comprising operating at least one processor to:

receive map data and telematics data originating from telematics devices installed in a plurality of vehicles;

identify, using the map data, one or more roadway intersections;

determine, using the telematics data and/or map data, for each of the one or more roadway intersections, one or more roadway intersection metrics thereof;

determine a hazard rating for each roadway of each roadway intersection based at least in part on a number of collisions that have occurred therealong within a selected time period; and generate a collision probability for each roadway intersection by inputting into a machine learning model the one or more roadway intersection metrics and the hazard rating of each roadway thereof, the collision probability representing a risk of collision for a vehicle traversing the intersection.

10. The method of claim 9, wherein the one or more roadway intersection metrics comprise an intersection turn percentage, an intersection traversal time, an intersection complexity metric, or a combination thereof.

11. The method of claim 10, wherein the intersection turn percentage comprises a left turn percentage, a right turn percentage, a straight-through percentage, or a combination thereof.

12. The method of claim 11, wherein the intersection traversal time comprises a left turn time, a right turn time, a straight-through time, or a combination thereof.

13. The method of claim 11, wherein the intersection complexity metric comprises an intersection vehicle entropy, an intersection turn entropy, an intersection road entropy, or a combination thereof.

14. The method of claim 9, further comprising operating the at least one processor to determine, using the telematics data and/or the map data, one or more roadway metrics of each roadway of each roadway intersection.

15. The method of 14, wherein the one or more roadway metrics comprise a static roadway metric, a driving behavior metric, a traffic volume metric, a traffic speed metric, a travel time metric, an environmental metric, a congestion metric, a vehicle complexity metric, or a combination thereof.

16. The method of claim 14, wherein the generating of the collision probability of each roadway intersection comprises operating the at least one processor to input into the machine learning model the one or more roadway intersection metrics, the hazard rating, and the one or more roadway metrics of each roadway thereof.

17. A non-transitory computer readable medium having instructions stored thereon executable by at least one processor to implement a method for predicting collision risk associated with a roadway intersection, the method comprising operating at least one processor to:

receive map data and telematics data originating from telematics devices installed in a plurality of vehicles;

identify, using the map data, one or more roadway intersections;

determine, using the telematics data and/or map data, for each of the one or more roadway intersections, one or more roadway intersection metrics thereof;

determine a hazard rating for each roadway of each roadway intersection based at least in part on a number of collisions that have occurred therealong within a selected time period; and generate a collision probability for each roadway intersection by inputting into a machine learning model the one or more roadway intersection metrics and the hazard rating of each roadway thereof, the collision probability representing a risk of collision for a vehicle traversing the intersection.

* * * * *